United States Patent
Patnaikuni et al.

(10) Patent No.: US 11,175,791 B1
(45) Date of Patent: Nov. 16, 2021

(54) AUGMENTED REALITY SYSTEM FOR CONTROL BOUNDARY MODIFICATION

(71) Applicant: International Business Machines Corporation, Armonk, NY (US)

(72) Inventors: Subha Kiran Patnaikuni, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/036,112

(22) Filed: Sep. 29, 2020

(51) Int. Cl.
| | | |
|---|---|---|
| *G06F 3/0481* | (2013.01) | |
| *G06F 3/0486* | (2013.01) | |
| *G06F 3/0482* | (2013.01) | |
| *G06F 3/01* | (2006.01) | |
| *G02B 27/01* | (2006.01) | |
| *G06T 19/00* | (2011.01) | |

(52) U.S. Cl.
CPC ...... *G06F 3/04815* (2013.01); *G02B 27/0172* (2013.01); *G02B 2027/0174* (2013.01); *G02B 2027/0178* (2013.01); *G06F 3/011* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 4,869,574 A | * | 9/1989 | Hartman | G02B 27/46 359/561 |
| 6,037,936 A | * | 3/2000 | Ellenby | G06F 3/04812 715/764 |
| 6,292,158 B1 | * | 9/2001 | Amafuji | G02B 27/017 345/7 |
| 7,084,887 B1 | * | 8/2006 | Sato | A63F 13/10 345/633 |
| 7,900,225 B2 | * | 3/2011 | Lyon | G06Q 30/0251 725/32 |
| 8,046,719 B2 | * | 10/2011 | Skourup | G06F 3/011 715/848 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Jordany Nunez
(74) *Attorney, Agent, or Firm* — William H. Hartwell

(57) ABSTRACT

A computer device tracks a field of view of a user wearing augmented reality eyewear, wherein within the field of view of the user the user utilizes one or more computing devices. The computing device identifies an orientation of the one or more computing devices. The computing device determines whether to present a holographic display to the user in two dimensions (2-D) or three dimensions (3-D) based, at least in part, on the orientation of the one or more computing devices. The computing device generates the holographic display and displays the holographic display to the user via the augmented reality eyewear, wherein the holographic display extends beyond a boundary of the one or more computing devices. The computing device updates the holographic display based, at least in part, on activity of the user.

20 Claims, 7 Drawing Sheets

(56) References Cited

U.S. PATENT DOCUMENTS

| | | | |
|---|---|---|---|
| 8,321,219 B2* | 11/2012 | Mozer | G10L 15/24 704/236 |
| 8,446,337 B2* | 5/2013 | Li | G06F 3/1454 345/1.1 |
| 8,502,780 B1* | 8/2013 | Park | G06F 3/04886 345/165 |
| 8,576,276 B2* | 11/2013 | Bar-Zeev | G06T 19/006 348/53 |
| 8,730,269 B2* | 5/2014 | Pinto | G06F 1/1694 345/684 |
| 8,847,953 B1* | 9/2014 | Cho | G06T 19/006 345/420 |
| 8,994,721 B2* | 3/2015 | Matsuda | G06F 3/04815 345/419 |
| 9,341,849 B2* | 5/2016 | Wong | G06F 3/011 |
| 9,547,406 B1* | 1/2017 | Wheeler | G06F 3/04883 |
| 9,552,676 B2* | 1/2017 | Wong | G02B 27/017 |
| 9,836,120 B2* | 12/2017 | Kobayashi | G06F 3/013 |
| 9,928,569 B2 | 3/2018 | Bean | |
| 10,001,645 B2* | 6/2018 | Norden | G06F 3/0484 |
| 10,043,317 B2* | 8/2018 | Kline | G06Q 30/06 |
| 10,175,650 B2* | 1/2019 | Kline | G09G 3/001 |
| 10,248,863 B2* | 4/2019 | Ekambaram | G06K 9/00671 |
| 10,289,376 B2* | 5/2019 | Baek | G06F 3/1454 |
| 10,331,110 B2* | 6/2019 | Lection | B33Y 50/00 |
| 10,486,060 B2* | 11/2019 | Miller | G06F 3/0346 |
| 10,565,451 B2* | 2/2020 | Ekambaram | G06F 1/163 |
| 10,664,218 B2* | 5/2020 | Kaufthal | G06F 3/1423 |
| 10,775,740 B2* | 9/2020 | Rakshit | G03H 1/2249 |
| 10,810,801 B2* | 10/2020 | Floury | G09G 5/14 |
| 10,909,761 B1* | 2/2021 | Reid | G06T 19/006 |
| 10,928,774 B2* | 2/2021 | Kline | G03H 1/2249 |
| 10,949,554 B2* | 3/2021 | Rakshit | G06F 21/10 |
| 10,976,704 B2* | 4/2021 | Rakshit | G03H 1/0011 |
| 10,981,046 B2* | 4/2021 | Karafin | H04N 13/302 |
| 2003/0014212 A1* | 1/2003 | Ralston | H04N 13/194 702/150 |
| 2006/0038833 A1* | 2/2006 | Mallinson | A63F 13/04 345/633 |
| 2008/0266323 A1* | 10/2008 | Biocca | G06F 3/0426 345/633 |
| 2009/0189974 A1* | 7/2009 | Deering | G02B 27/017 348/46 |
| 2009/0289956 A1* | 11/2009 | Douris | G01C 21/3602 345/633 |
| 2010/0115458 A1* | 5/2010 | Marano | G06F 3/0485 715/784 |
| 2011/0285704 A1* | 11/2011 | Takeda | G06T 15/00 345/419 |
| 2012/0032955 A1* | 2/2012 | Matsuda | G06F 3/04815 345/419 |
| 2013/0044128 A1* | 2/2013 | Liu | G06T 19/006 345/633 |
| 2013/0342570 A1* | 12/2013 | Kinnebrew | G09G 3/003 345/633 |
| 2014/0002444 A1* | 1/2014 | Bennett | G06F 3/0304 345/419 |
| 2014/0002496 A1* | 1/2014 | Lamb | G06T 19/006 345/633 |
| 2014/0267416 A1* | 9/2014 | Douris | G06Q 30/0205 345/633 |
| 2015/0009132 A1* | 1/2015 | Kuriya | G02B 27/017 345/156 |
| 2015/0205106 A1* | 7/2015 | Norden | G02B 27/017 345/7 |
| 2016/0109953 A1* | 4/2016 | Desh | G06F 1/163 345/169 |
| 2017/0060514 A1* | 3/2017 | Kaufthal | G02B 27/0172 |
| 2017/0091902 A1* | 3/2017 | Bostick | G06F 40/279 |
| 2017/0131964 A1* | 5/2017 | Baek | G06T 19/006 |
| 2017/0205895 A1* | 7/2017 | Kasahara | G06F 3/0425 |
| 2017/0236331 A1* | 8/2017 | Bryson | G06T 19/006 345/633 |
| 2017/0364747 A1* | 12/2017 | Ekambaram | G06K 9/00671 |
| 2018/0075575 A1* | 3/2018 | Bostick | G06K 9/00892 |
| 2018/0089869 A1* | 3/2018 | Bostick | G06F 16/9535 |
| 2018/0140942 A1* | 5/2018 | Miller | G06F 3/011 |
| 2018/0144548 A1* | 5/2018 | Kline | G06F 3/011 |
| 2018/0164982 A1* | 6/2018 | Rakshit | G06F 3/04815 |
| 2018/0196260 A1* | 7/2018 | Ekambaram | G02B 27/017 |
| 2018/0330542 A1* | 11/2018 | Bharti | G06F 3/04845 |
| 2018/0374273 A1* | 12/2018 | Holzer | H04N 5/23238 |
| 2019/0147248 A1* | 5/2019 | Ekambaram | H04N 7/014 348/77 |
| 2019/0187875 A1* | 6/2019 | Kline | G06F 3/04883 |
| 2019/0227763 A1* | 7/2019 | Kaufthal | G06F 3/0482 |
| 2019/0278082 A1* | 9/2019 | Ekambaram | G02B 27/0101 |
| 2019/0279407 A1* | 9/2019 | McHugh | G06F 1/1694 |
| 2019/0325660 A1* | 10/2019 | Schmirler | G06F 3/011 |
| 2019/0369555 A1* | 12/2019 | Rakshit | G06F 1/1647 |
| 2020/0026239 A1* | 1/2020 | Rakshit | G06F 3/04815 |
| 2020/0050777 A1* | 2/2020 | Rakshit | G06F 21/62 |
| 2020/0051337 A1 | 2/2020 | Reynolds | |
| 2020/0065587 A1 | 2/2020 | Hoover | |
| 2020/0074740 A1 | 3/2020 | Singh | |
| 2020/0126141 A1* | 4/2020 | Bostick | G06Q 30/0631 |
| 2020/0228790 A1* | 7/2020 | Rakshit | H04N 13/388 |
| 2020/0233561 A1* | 7/2020 | Kline | G06F 1/1626 |
| 2021/0097754 A1* | 4/2021 | Vankipuram | H04N 13/332 |

* cited by examiner

AUGMENTED REALITY SYSTEM FOR CONTROL BOUNDARY MODIFICATION

BACKGROUND OF THE INVENTION

The present invention relates generally to the field of augmented reality, and more particularly to constructing and updating holographic displays for a user.

Generally, computer interfaces are bound by the physical boundaries of computing devices' respective screens. In general, augmented reality presents information to a user in a manner which is not limited to the physical boundaries of traditional computing device interfaces.

SUMMARY

Embodiments of the present invention provide a method, system, and program product.

A first embodiment encompasses a method. One or more processors track a field of view of a user wearing augmented reality eyewear, wherein within the field of view of the user the user utilizes one or more computing devices. The one or more processors identify an orientation of the one or more computing devices. The one or more processors determine whether to present a holographic display to the user in two dimensions (2-D) or three dimensions (3-D) based, at least in part, on the orientation of the one or more computing devices. The one or more processors generate the holographic display and display the holographic display to the user via the augmented reality eyewear, wherein the holographic display extends beyond a boundary of the one or more computing devices. The one or more processors update the holographic display based, at least in part, on activity of the user.

A second embodiment encompasses a computer program product. The computer program product includes one or more computer-readable storage media and program instructions stored on the one or more computer-readable storage media. The program instructions include program instructions to track a field of view of a user wearing augmented reality eyewear, wherein within the field of view of the user the user utilizes one or more computing devices. The program instructions include program instructions to identify an orientation of the one or more computing devices. The program instructions include program instructions to determine whether to present a holographic display to the user in two dimensions (2-D) or three dimensions (3-D) based, at least in part, on the orientation of the one or more computing devices. The program instructions include program instructions to generate the holographic display and display the holographic display to the user via the augmented reality eyewear, wherein the holographic display extends beyond a boundary of the one or more computing devices. The program instructions include program instructions to update the holographic display based, at least in part, on the activity of the user.

A third embodiment encompasses a computer system. The computer system includes one or more computer processors, one or more computer-readable storage media, and program instructions stored on the computer-readable storage media for execution by at least one of the one or more processors. The program instructions include program instructions to track a field of view of a user wearing augmented reality eyewear, wherein within the field of view of the user the user utilizes one or more computing devices. The program instructions include program instructions to identify an orientation of the one or more computing devices. The program instructions include program instructions to determine whether to present a holographic display to the user in two dimensions (2-D) or three dimensions (3-D) based, at least in part, on the orientation of the one or more computing devices. The program instructions include program instructions to generate the holographic display and display the holographic display to the user via the augmented reality eyewear, wherein the holographic display extends beyond a boundary of the one or more computing devices. The program instructions include program instructions to update the holographic display based, at least in part, on the activity of the user.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention provide for data to be presented to a user in a more efficient and responsive manner than that provided by an existing interface of a computing device, and without the user having to navigate away from a current application executing on the computing device. Embodiments of the present invention further minimize network bandwidth and can read/write data at near device-native speeds. Such an approach yields the ability for the user to maintain and exercise strict control over when, where, and by whom the data can be read without over-encumbering a cloud application.

The present invention will now be described in detail with reference to the Figures.

Figure 1:
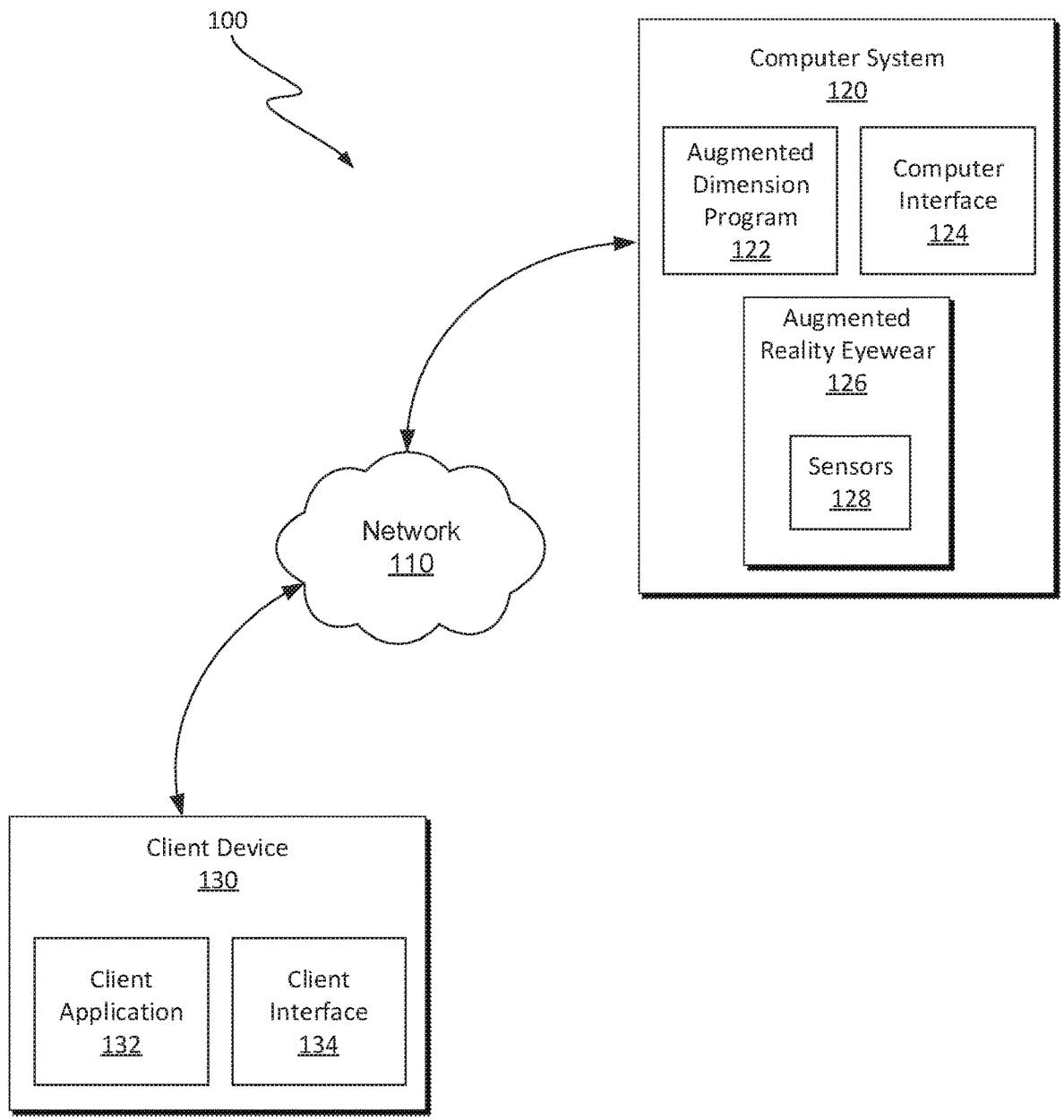
FIG. 1 is a functional block diagram illustrating a computing environment, in which a system expands a user interface using augmented reality, in accordance with an exemplary embodiment of the present invention.

FIG. 1 is a functional block diagram illustrating computing environment, generally designated 100, in accordance with one embodiment of the present invention. Computing environment 100 includes computer system 120 and client device 130 connected over network 110. Computer system 120 includes augmented dimension program 122, computer interface 124, augmented reality eyewear 126, and sensors 128. Client device 130 includes client application 132 and client application 134.

In various embodiment of the present invention, computer system 120 is a computing device that can be a standalone device, a server, a laptop computer, a tablet computer, a netbook computer, a personal computer (PC), a personal digital assistant (PDA), a desktop computer, or any programmable electronic device capable of receiving, sending, and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing augmented dimension program 122, computer interface 124, augmented reality eyewear 126, and sensors 128. Computer system 120 may include internal and external hardware components, as described in further detail with respect to FIG. 7.

In this exemplary embodiment, augmented dimension program 122 and computer interface 124 are stored on computer system 120. However, in other embodiments, augmented dimension program 122 and computer interface 124 are stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120 and client device 130 and various other computer systems (not shown), in accordance with desired embodiment of the present invention.

In the embodiment depicted in FIG. 1, augmented dimension program 122, at least in part, has access to client application 132 and can communicate data stored on computer system 120 to client device 130 and various other computer systems (not shown). More specifically, augmented dimension program 122 defines a user of computer system 120 that has access to data stored on client device 130.

Augmented dimension program 122 is depicted in FIG. 1 for illustrative simplicity. In various embodiments of the present invention, augmented dimension program 122 represents logical operations executing on computer system 120, where computer interface 124 manages the ability to view these logical operations that are managed and executed in accordance with augmented dimension program 122. In some embodiments, augmented dimension program 122 represents a system that analyzes data and generates a holographic display to be presented to a user wearing augmented reality eyewear 126.

Computer system 120 includes computer interface 124. Computer interface 124 provides an interface between computer system 120 and client device 130. In some embodiments, computer interface 124 can be a graphical user interface (GUI) or a web user interface (WUI) and can display, text, documents, web browsers, windows, user options, application interfaces, and instructions for operation, and includes the information (such as graphic, text, and sound) that a program presents to a user and the control sequences the user employs to control the program. In some embodiments, computer system 120 accesses data communicated from client device 130 via a client-based application that runs on computer system 120. For example, computer system 120 includes mobile application software that provides an interface between computer system 120 and client device 130. In various embodiments, computer system 120 communicates the GUI or WUI to client device 130 for instruction and use by a user of client device 130.

In various embodiments, client device 130 is a computing device that can be a standalone device, a server, a laptop computer, a tablet computer, a netbook computer, a personal computer (PC), a personal digital assistant (PDA), a desktop computer, or any programmable electronic device capable of receiving, sending and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing client application 132 and client interface 134. Client device 130 may include internal and external hardware components, as described in further detail with respect to FIG. 7.

Augmented reality eyewear 126 are depicted in FIG. 1 for illustrative simplicity. In various embodiments of the present invention, augmented reality eyewear 126 represent wearable eyewear for a user of client device 130 wherein augmented reality eyewear 126 receives data from computer system 120 and client device 130. In various embodiments, augmented reality eyewear 126 includes sensors 128, where sensors 128 include, but no limited to, motion capture cameras, displays (e.g., LCD screens, etc.), etc. In various embodiments, sensors 128 determine whether a specific action is likely to take place, based on, at least, data received from client application 132 and generates data that is communicated to augmented dimension program 122, wherein augmented dimension program 122 generates a digital modification and communicates the digital modification to augmented reality eyewear 126. Embodiments of the present invention provide that sensors 128 include, but are not limited to, one or more movement tracking modules and motion capture cameras, wherein the one or more movement tracking modules and motion capture cameras are small peripheral devices capable of tracking finger and hand movements and incorporating those movements into manipulation of a holographic display.

In various embodiments, augmented reality eyewear 126 is a computing device that represents any programmable electronic device capable of executing machine readable program instructions and communicates with computing device 130 and executes on computer system 120. In some embodiments, augmented reality eyewear 126 represents a computing device capable of executing a computer-aided design model and generates a heads-up display that expands client interface 134 with a holographic display.

In various embodiments, a user of client device 130 wishes to create a personalized holographic control display (e.g., holographic display) that extends beyond the physical boundary of client device 130, where the user of client device 130 wears head-mounted augmented reality (AR)/virtual reality (VR) eyewear (e.g., augmented reality eyewear 126). In various embodiments, the user of client device 130 navigates client device 130 and various applications executing on client device 130, where the user visualizes the holographic display that extends beyond the physical boundary of client device 130 and interacts with the holographic display with the assistance of augmented reality eyewear 126. Embodiments of the present invention provide that the dimension, shape, alignment, etc. of the holographic display can be modified by a user of client device 130 utilizing, at least, a request generated by client application 132. In various embodiments, the holographic display is provided by augmented reality eyewear 126, where depending upon the orientation of client device 130 (e.g., lying on a flat surface, held in the hand by the user of client device 130, or positioned vertically in front of the user's face, etc.) then the holographic display will be positioned laterally along the physical boundary of client device 130.

In various embodiments, a user of client device 130 can share the holographic display with various other users who wear head-mounted augmented reality (AR)/virtual reality (VR) eyewear (e.g., augmented reality eyewear 126). In various embodiments, the holographic display shared with the various other users will map according to how the original user defined the parameters of the holographic display, and additionally, the various other users will be able to view the holographic display on their respective head-mounted AR/VR eyewear and interact with the holographic display using their respective head-mounted AR/VR eyewear and/or their respective computing devices.

In various embodiments, augmented dimension program 122 analyzes the activity of the user operating client device 130, where augmented dimension program 122 identifies the user's contextual needs and user preferences to adjust the holographic display around the physical boundary of the electronic device. In various embodiments, augmented dimension program 122 communicates a user preferences request instructing the user to update their user preferences that include, but are not limited to, (i) size and shape of the holographic display around client device 130, (ii) duration of time when the holographic display should be visible and duration of time when the holographic display should be turned off, (iii) orientation of the holographic display, and/or (iv) night mode (e.g., reduced brightness). In various embodiments, the contextual needs of the user identified by augmented dimension program 122 include, but are not limited to, (i) type of content displayed on client interface 134 (e.g., video, text, word processors, spreadsheets, news reports, etc.) and (ii) user ergonomics (e.g., the user's hand or other body part is obstructing the view of the holographic display or the computing device is orientated in a poor orientation).

In various embodiments, if the user is utilizing multiple computing devices (e.g., laptop, tablet computer, PC, etc.) that are present within the primary field of display (e.g., within the user's line of sight), then augmented dimension program 122 generates a holographic display for each individual computing device that extends around the physical boundary of the respective computing device. In various embodiments, augmented reality eyewear 126 displays each individual holographic display around the physical boundaries of the computing devices and allows the user to visualize the holographic displays and appreciate the information the holographic displays provide. In various embodiments, in a multi-computing device environment, if a user is performing the same activity on multiple devices (e.g., executing the same application on multiple computing devices), then augmented dimension program 122 creates a common holographic boundary between the multi-computing devices of the environment and displays the holographic display within the common boundary. In various embodiments, if augmented dimension program 122 identifies that, at least, two computing devices within the multi-computing device environment are performing the same application or software then the holographic boundary of the two computing devices are occurring in common and augmented dimension program 122 merges the two holographic boundaries to create a seamless common holographic boundary between the two computing devices. In various embodiments within the multi-computing device environment, augmented dimension program 122 can merge or split the virtual boundaries of the holographic displays of each individual computing device, where a control menu will be displayed around the created holographic displays.

Figure 2:
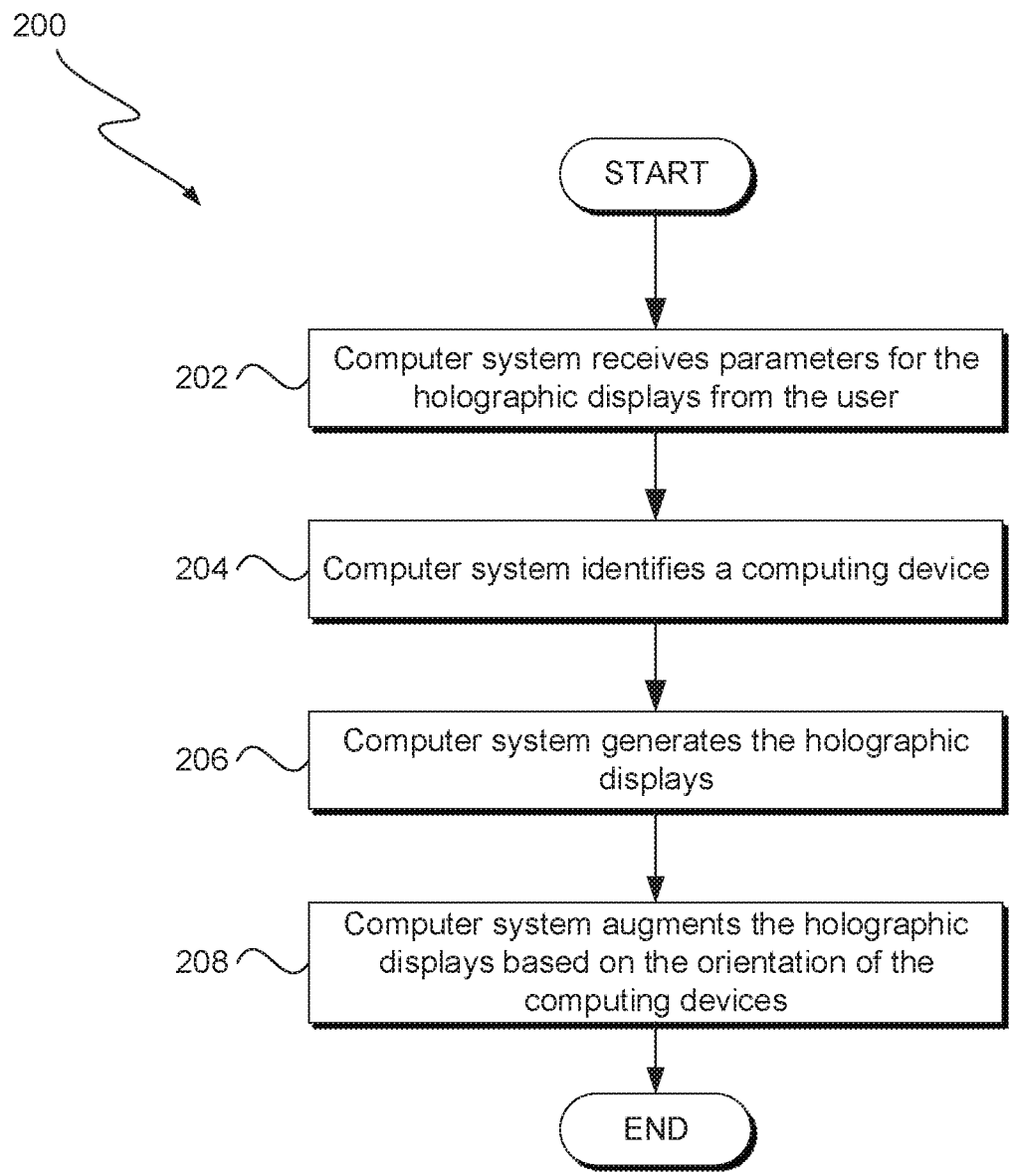
FIG. 2 illustrates operational processes for expanding a user interface, on a computing device within the environment of FIG. 1, in accordance with an exemplary embodiment of the present invention.

FIG. 2 is a flowchart depicting operations for an augmented reality system to expand a user interface for computing environment 100, in accordance with an illustrative embodiment of the present invention. More specifically, FIG. 2, depicts combined overall operations 200, of augmented dimension program 122. In some embodiments, operations 200 represents logical operations of augmented dimension program 122, wherein augmented dimension program 122 represents interactions between logical computing devices communicating with computer system 120 and various other computing devices connected to network 110. It should be appreciated that FIG. 2 provides an illustration of one implementation and does not imply any limitations with regard to the environments may be made. In one embodiment, the series of operations, in flowchart 200, can be terminated at any operation. In addition to the features previously mentioned, any operations of flowchart 200, can be resumed at any time.

In operation 202, augmented dimension program 122 receives parameters for the holographic display from the user. In various embodiments, the user of client device 130 utilizes client application 132 to define the parameters of the holographic display for one or more computing devices. In various embodiments, the parameters include, but are not limited to, (i) size, shape, and orientation of the holographic display and (ii) various options for a personalized menu. In various embodiments, augmented dimension program 122 analyzes the parameters of the holographic display to identify how to prepare the holographic display to be presented to the user of client device 130. In various embodiments, the personalized menu represents an interactive holographic display in which the user can request variations of the personal menu for display. In various embodiments, the interactions for the personal menu include, but are not limited to, (i) device settings, (ii) settings for the application executing on computing device 130, and (iii) a heads up display that extends the viewing area of client interface 134. In various embodiments, augmented dimension program 122 generates the holographic display in 2-D or 3-D based on, at least, the orientation of client device 130 that was identified by augmented reality eyewear 126. In various embodiments, if client device 130 is resting on a flat surface (i.e., a table) then augmented dimension program 122 generates the holographic display in 2-D. In various embodiments, if client device 130 is upright and facing the user (e.g., a computer screen attached to a stand, or resting in the user's hand, or a laptop opened with the screen of the laptop facing towards the user) then augmented dimension program 122 generates the holographic display in 3-D.

In operation 204, augmented dimension program 122 identifies a computing device. In various embodiments, augmented reality eyewear 126 includes, at least, a retinal scanner, where augmented reality eyewear 126 authenticates the user of client device 130 and prepares the holographic display created by the authenticated user. In various embodiments, augmented reality eyewear 126 prepares and presents the holographic display based on, at least, the user wearing the augmented reality eyewear 126. Embodiments of the present invention provide that one or more users can wear augmented reality eyewear 126 and that the one or more users can have their own respective holographic display for client device 130. In various embodiments, augmented dimension program 122 identifies a computing device associated with the user and the parameters of the holographic display. In various embodiments, augmented dimension program 122 identifies whether the holographic display should be directed towards a respective computing device (e.g., client device 130) or an application executing on the device (e.g., whether the holographic display should be generally used to operate the computing device or whether the holographic display should be used to operate an individual application executing on the computing device). In various embodiments, augmented dimension program 122 also identifies whether the proposed holographic display can be reapplied for various other computing devices or various other applications (e.g., the holographic display for one computing device can be utilized for various other computing devices or applications executing on the computing devices). Embodiments of the present invention provide that holographic displays can be generated that are not specific to a singular computing device or application executing on that computing device. In various embodiments the reapplication of holographic displays represents personalized menus for a user that is capable of navigating one or more computing devices and one or more applications executing on those one or more computing devices.

In operation 206, augmented dimension program 122 generates the holographic display. In various embodiments, augmented dimension program 122 generates the holographic display based on, at least, the defined parameters by the user of client device 130 and the identified computing device. In various embodiments, augmented dimension program 122 identifies the computing device (e.g., client device 130) the user wishes to generate a holographic display for, and additionally, whether the holographic display is to be utilized for a respective application executing on the computing device. In various embodiments, augmented dimension program 122 identifies that the holographic display is used for general operation of client device 130, where the holographic display presents a personalized menu for the user of client device 130 to interact with and obtain information from client device 130. In various embodiments, augmented dimension program 122 generates a digital representation of the holographic display based on, at least, the parameters defined by the user of client device 130 and communicates the digital representation to augmented reality eyewear 126 with program instructions instructing augmented reality eyewear 126 to virtualize and present the holographic display laterally around the physical boundary of client device 130 for the user of client device 130 to visualize and interact with. Embodiments of the present invention provide that the holographic display is larger than the interface of client device 130 and/or the holographic display extends beyond the physical boundary of client device 130, where the extension of beyond the physical boundary creates an extension of the interface that is being presented to the user on client device 130. In various embodiments, augmented dimension program 122 additionally communicates program instructions to augmented reality eyewear 126 to coach the user on how to interact with the holographic display. Embodiments of the present invention provide that (i) the holographic displays represent displays that allow the user to view and receive information from, where the user interacts with client device 130 to interact with the holographic displays, and (ii) the holographic displays represent displays that allow the user to interact directly with the holographic displays, where augmented reality eyewear 126 monitors and tracks the user's hand movements with the holographic display and communicates the tracking information to augmented dimension program 122 and augmented dimension program 122 executes the command associated with the user's hand movement. For example, the holographic display presents an extension of a news article for the user to view and the user uses their hand to scroll upward on the holographic display, where augmented reality eyewear 126 tracks the user's hand movement and communicates the tracking information to augmented dimension program 122 to execute a command that scrolls the news article upward on client interface 134 and the extension provided by the holographic display. In another example, the holographic display represents a settings menu for client device 130 and the user uses their hand to slide the brightness setting down, where augmented reality eyewear 126 tracks the user's hand movement and communicates the tracking information to augmented dimension program 122 to execute a command that lowers the brightness of client device 130 and the holographic display.

In operation 208, augmented dimension program 122 augments the holographic displays based on the orientation of the computing devices. In various embodiments, a user of client device 130 wears augmented reality eyewear 126, where sensors 128 executing on augmented reality eyewear 126 identify the ergonomics and the orientation of client device 130. In various embodiments, sensors 128 identify that client device 130 is placed on a flat physical surface and communicates this data to augmented dimension program 122. In various embodiments, augmented dimension program 122 receives data from sensors 128 on the ergonomics and orientation of client device 130, and generates an updated digital representation for the holographic display, where the holographic display is presented in 2-D, and communicates the updated holographic display to augmented reality eyewear 126 with program instructions instructing augmented reality eyewear 126 to present the updated holographic display around the physical boundary of client device 130. In various embodiments, augmented dimension program 122 receives data from sensors 128, where sensors 128 identify that client device 130 is held in the hand of the user or is held-in-place by a monitor stand within the field of view of the user. In various embodiments, augmented dimension program 122 generates, at least, a second updated digital representation for the holographic display, where the second updated digital representation is presented in 3-D, and communicates the second updated holographic display to augmented reality eyewear 126 with program instructions instructing augmented reality eyewear 126 to present the second updated holographic display around the physical boundary of client device 130. Embodiments of the present invention provide that sensors 128 actively monitor the field of view and identify the ergonomics and orientation of client device 130, where sensors 128 communicates an updated ergonomic and orientation data to augmented dimension program 122.

In various embodiments, augmented reality eyewear 126 identifies that client device 130 is resting on a flat surface (i.e., is placed on a table) where the screen of client device 130 is directed upwards towards the view of the user wearing augmented reality eyewear 126. In various embodiments, augmented reality eyewear 126 communicates this information to augmented dimension program 122 where augmented dimension program 122 generates and orientates the holographic display for client device 130 in 2-D. In various embodiments, augmented dimension program 122 communicates the 2-D holographic display with program instructions instructing augmented reality eyewear 126 to display the holographic display along the physical boundary of client device 130 and lock the holographic display in place so that the user is unable to manipulate the holographic display by interacting with the positioning of the holographic display. Embodiments of the present invention provide that the 2-D holographic display represents a flat display depicting a personal menu that includes, but is not limited to, (i) device settings, (ii) settings for the application executing on computing device 130, and (iii) a heads up display that extends the viewing area of client interface 134.

In various embodiments, augmented reality eyewear 126 identifies that client device 130 is positioned in an upright orientation and the screen of client device 130 is facing towards the view of the user wearing augmented reality eyewear 126 (e.g., computer screen attached to a stand, in the user's hand, a laptop opened with the screen of the laptop facing the view of the user, etc.). In various embodiments, augmented reality eyewear 126 communicates this information to augmented dimension program 122 where augmented dimension program 122 generates and orientates the holographic display for client device 130 in 3-D. In various embodiments, augmented dimension program 122 communicates the 3-D holographic display with program instructions instructing augmented reality eyewear 126 to display the 3-D holographic display along the physical boundary of client device 130. In various embodiments, the 3-D holographic display represent a three-dimensional shape, where based on the shape the holographic display provides different interactions for the user. In various embodiments, the 3-D holographic display represents a cube, where each of the six sides of the cube represents a different personalized menu. Embodiments of the present invention provide that augmented reality eyewear 126 tracks the user's hand movements and communicates this information to augmented dimension program 122 that analyzes the hand movement and determines based on, at least, the hand movement which of the six sides of the cube the user wishes to turn the cube towards. For example, the cube is displaying side one towards the user, and the user using their finger rotates the cube to the left which would rotate the cube and present side two to the user. In another example, the cube is displaying side one towards the user, the user using their finger rotates the cube upwards which would rotate the cube and present side six to the user. In various embodiments, the 3-D holographic display represents a sphere, where the sphere acts as a scroll bar or mouse that can interact with client interface 134 and/or an additional holographic display that may be presented above client device 130 which extends the view of the application populated onto client interface 134. For example, augmented reality eyewear 126 tracks the user's hand movements as the user interacts with the sphere (i.e., 3-D holographic display), where the user rolls the sphere up, which would scroll the application upward, or the user rolls the sphere down, which would scroll the application downwards. In another example, the sphere (i.e., 3-D holographic display) represents a visual depiction of the Earth that the user can rotate in a three-hundred and sixty (360) degree angle and view any portion of the Earth. Embodiments of the present invention provide that any three-dimensional shape can be presented to the user through augmented reality eyewear 126 and any personalized menu can be affixed to the 3-D holographic display for the user to interact and view.

In various embodiments, augmented dimension program 122 receives data and identifies the orientation and ergonomics of client device 130. In various embodiments, augmented dimension program 122 identifies the ergonomics of client device 130, where the user is holding client device 130 in either their left hand or right hand. Based on, at least, the ergonomics of client device 130 augmented dimension program 122 generates the holographic display to not interfere with the user's hands. In one example embodiment, augmented dimension program 122 identifies that the user is holding client device 130 in their left hand, augmented dimension program 122 configures the holographic display to not be presented on the left lateral side of the physical boundary of client device 130 to avoid the holographic display from overlapping with the user's thumb or portion of their hand. Additionally, in this example embodiment, augmented dimension program 122 configures the holographic display to present on the right lateral side and top of the physical boundary of client device 130, where the user can utilize their right hand and fingers to interact with the holographic display.

In various embodiments, augmented dimension program 122 receives data from sensors 128, where sensors 128 identify multiple computing devices within the field of view of the user and augmented reality eyewear 126 (i.e., multi-computing device environment). In various embodiments, augmented dimension program 122 identifies the relative distance between the multiple computing devices present within the multi-computing device environment. In various embodiments, augmented dimension program 122 further tracks the user's activity including which computing device the user is utilizing at any given period of time. Additionally, augmented dimension program 122 correlates the user's activity between the multi-computing device environment and identifies whether the user is performing an identical activity between the multiple computing devices or if the user is performing different activities between the multiple computing devices. In various embodiments, if augmented dimension program 122 identifies that the user is performing an identical activity between the multiple computing devices, and if augmented dimension program 122 determines that screens of the multiple computing devices are within a threshold value of distance of one another, then augmented dimension program 122 generates a common holographic display between the multiple computing devices. In various embodiments, where a common holographic display is presented to the user, augmented dimension program 122 merges the virtual boundary of the multiple computing devices and generates a singular holographic display between the physical boundary of the multiple computing devices. In various embodiments, if augmented dimension program 122 identifies that the user is performing a different activity on each individual computing device then each computing device will contain its own respective holographic display around the physical boundary that is presented to the user.

In various embodiments, augmented dimension program 122 can receive a request from the user of client device 130, where the user wishes to merge or split various holographic displays within the multi-computing device environment. Additionally, in various embodiments, augmented dimension program 122 will analyze the request and determine how to update the holographic displays with respect to the user's request. In various embodiments, augmented dimension program 122 generates an updated holographic display with respect to the user's request and communicates the holographic displays with program instructions to augmented reality eyewear 126 instructing augmented reality eyewear 126 to present the updated holographic displays to the user.

Figure 3:
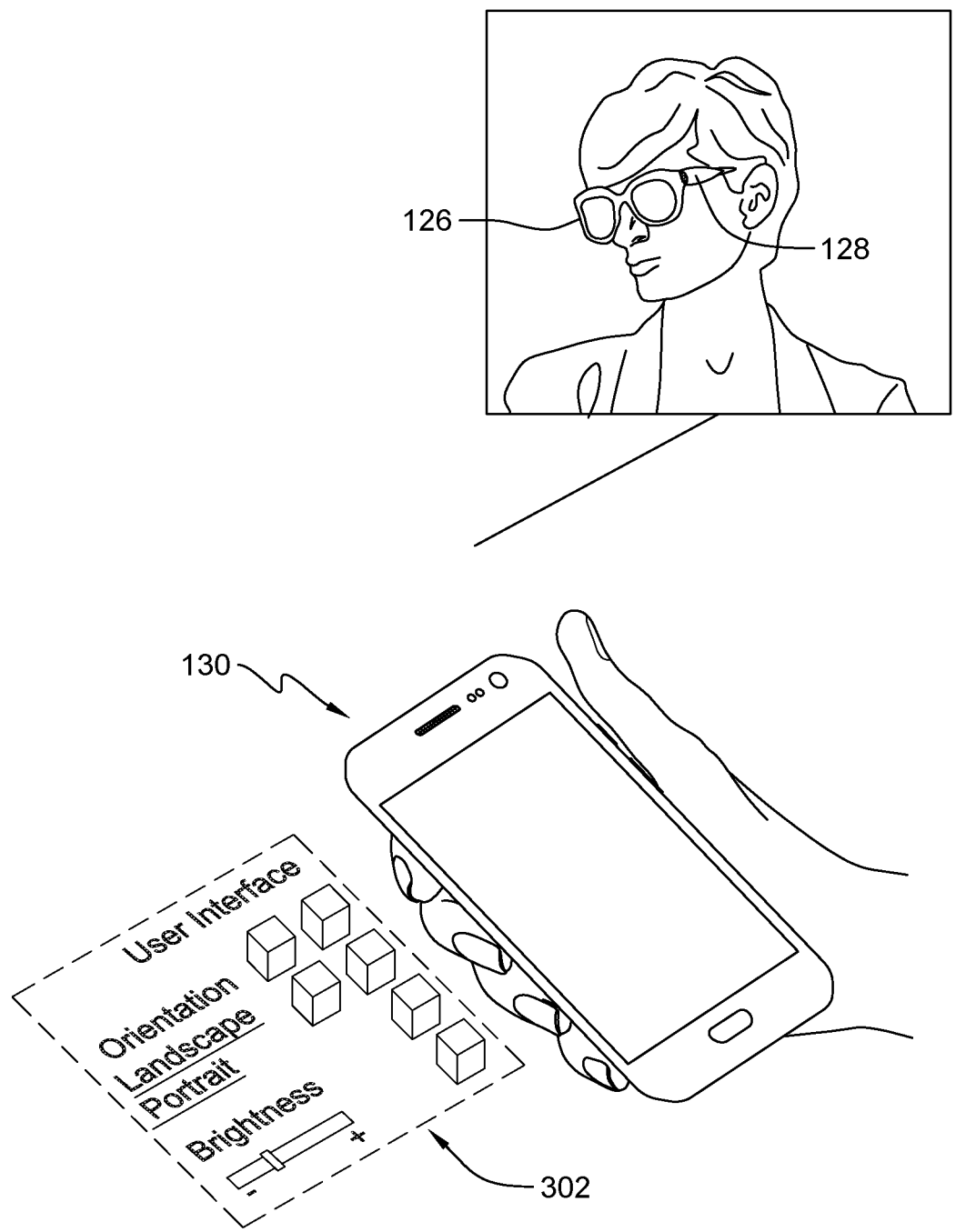
FIG. 3 depicts a block diagram of a holographic display being presented to a user wearing augmented reality eyewear, in accordance with an embodiment of the present invention.

FIG. 3 depicts an illustration of a user wearing augmented reality eyewear 126 and holding client device 130 in their hand. In various embodiments, FIG. 3 includes a depiction of augmented reality eyewear 126 on the user's head and includes sensors 128. In various embodiments, augmented reality eyewear 126 includes displays (e.g., LCD screens, etc.) and sensors 128 that include, but are not limited to, motion capture cameras, microphone, speakers. In various embodiments, FIG. 3 depicts holographic display 302 around the physical boundary of client device 130 within the hand of the user.

In various embodiments, augmented dimension program 122 receives data from sensors 128 executing on augmented reality eyewear 126 and identifies that the user is holding client device 130 in their left hand. In various embodiments, augmented dimension program 122 analyzes user preferences related to client device 130 and the activity executing on client device 130 and generates a holographic display to present to the user. In various embodiments, augmented dimension program 122 determines that the user is reviewing a news article and based on, at least, the user preferences, augmented dimension program 122 generates the holographic display to extend the interface of client device 130 by generating a holographic display that illustrates an extension of the news article so that more content is displayed to the user. In various embodiments, augmented dimension program 122 communicates the holographic display with program instructions instructing augmented reality eyewear 126 to present the holographic display on the top lateral side of client device 130 utilizing the displays executing on augmented reality eyewear 126.

In alternative embodiments, augmented dimension program 122 receives data from client device 130 indicating that the user is navigating the client device 130 and is requesting augmented dimension program 122 to generate a user interface holographic display. In various embodiments, augmented dimension program 122 receives data from sensors 128 executing on augmented reality eyewear 126 and identifies that the user is holding client device 130 in their left hand. In various embodiments, augmented dimension program 122 analyzes user preferences related to client device 130 and the activity (e.g., navigating client device 130) executing on client device 130 and generates a holographic display to present to the user. In various embodiments, augmented dimension program 122 generates a user interface to assist the user to navigate through client device 130. In various embodiments, the user interface includes, but is not limited to, (i) thumbnails to start various application stored on client device 130, and (ii) settings associated with the client device (e.g., brightness settings, volume settings, etc.). In various embodiments, augmented dimension program 122 communicates the holographic display to augmented reality eyewear 126 with program instructions instructing augmented reality eyewear 126 to utilize the displays (e.g., LCD screens, etc.) to present the holographic display on the right lateral side of the physical boundary of client device 130. In various embodiments, the program instructions communicated by augmented dimension program 122 further include program instructions to execute sensors 128 (e.g., motion capture cameras) to monitor the field of view and determine whether the user utilizes their right hand to interact with the holographic display. Additionally, in various embodiments, if sensors 128 determine that the user interacts with holographic display utilizing their right hand, then sensors 128 communicate the action to augmented dimension program 122, where augmented dimension program 122 communicates program instructions to client device 130 instructing client device 130 to execute the action indicated by the user on client device 130.

Figure 4:
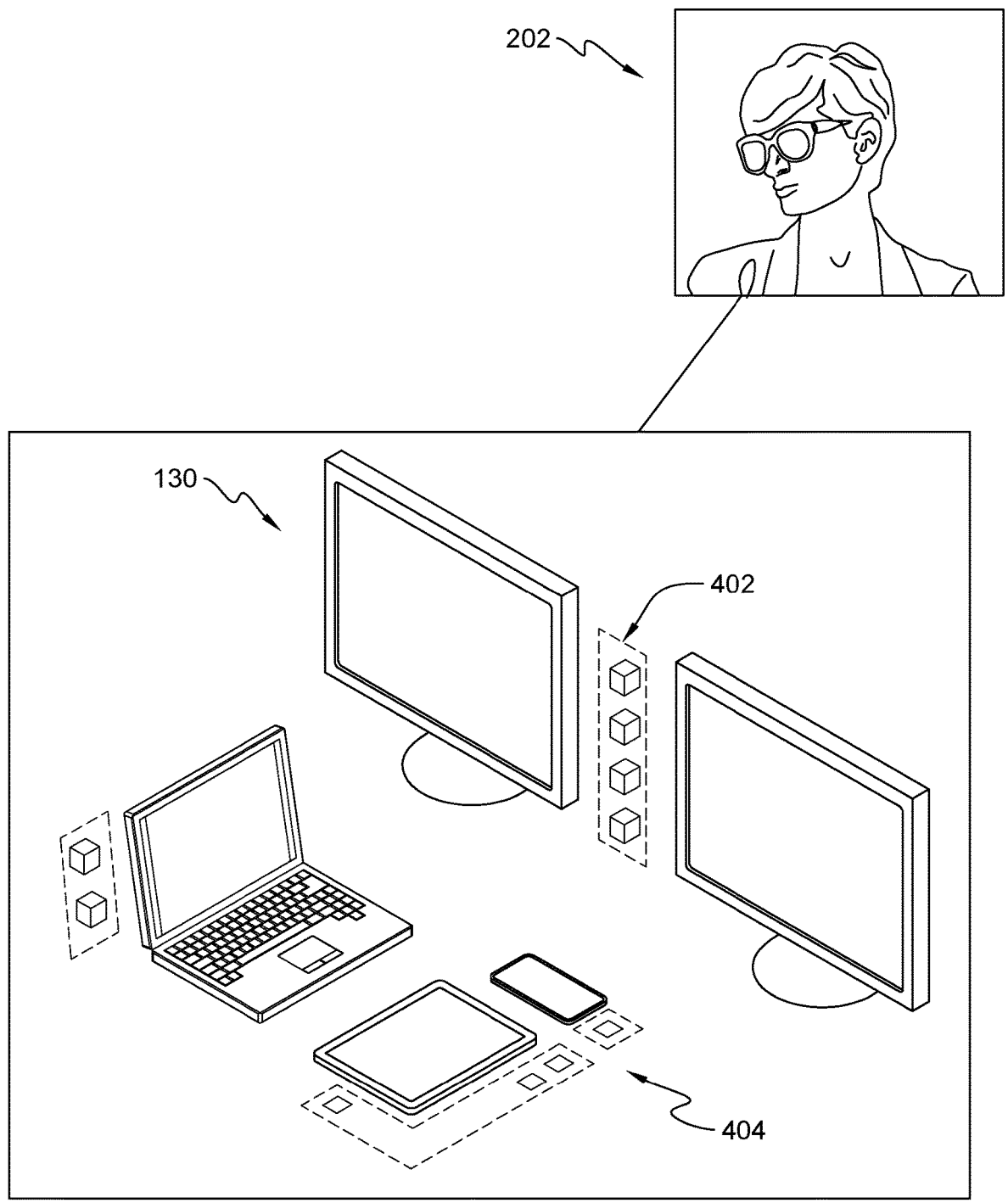
FIG. 4 depicts a block diagram of multiple computing devices operating within the computing environment of FIG. 1, in accordance with an embodiment of the present invention.

FIG. 4 depicts a multi-computing device environment that includes various computing devices (e.g., client device 130) and the respective holographic displays around the physical boundaries of the various computing devices. In various embodiments, FIG. 4 depicts holographic display 402 that represents a menu around a tablet computer laying on a flat surface. In various embodiments, FIG. 4 depicts holographic display 404 that represents a common holographic display between two computing device monitors, where the user is executing an identical or similar application between the two computing device monitors.

In various embodiments, augmented dimension program 122 receives data from client device 130 that the user is navigating one or more computing devices within the multi-computing device environment and is requesting augmented dimension program 122 to generate a user interface holographic display. In various embodiments, augmented dimension program 122 receives data from sensors 128 executing on augmented reality eyewear 126 and identifies multiple computing devices within the field of view of the user and augmented reality eyewear 126 (i.e., multi-computing device environment). In various embodiments, augmented dimension program 122 identifies the relative distance between the multiple computing devices present within the multi-computing device environment. In various embodiments, augmented dimension program 122 receives data from sensors 128, where sensors 128 tracks the user's activity including which computing device the user is utilizing at any given period of time. In various embodiments, augmented dimension program 122 generates one or more holographic displays for the various computing devices within the multi-computing device environment. In various embodiments, augmented dimension program 122 determines that the user is reviewing a news article on a computing tablet within the multi-computing device environment and augmented dimension program 122 generates an extension holographic display and communicates the holographic display with program instructions instructing augmented reality eyewear 126 to present the news article holographic display to the user on the computing tablet. In various embodiments, augmented dimension program 122 further determines that the user is utilizing dual monitors on their PC and that the user is executing the same application on each monitor. In various embodiments, augmented dimension program 122 connects the virtual boundary between the two monitors to create one cohesive holographic display between the monitors. In various embodiments, augmented dimension program 122 further determines that the user request a user interface to be displayed within the virtual boundary. In various embodiments, augmented dimension program 122 generates holographic display that illustrates a user interface, as discussed above, and communicates the holographic display to augmented reality eyewear 126 to present to the user utilizing the displays.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
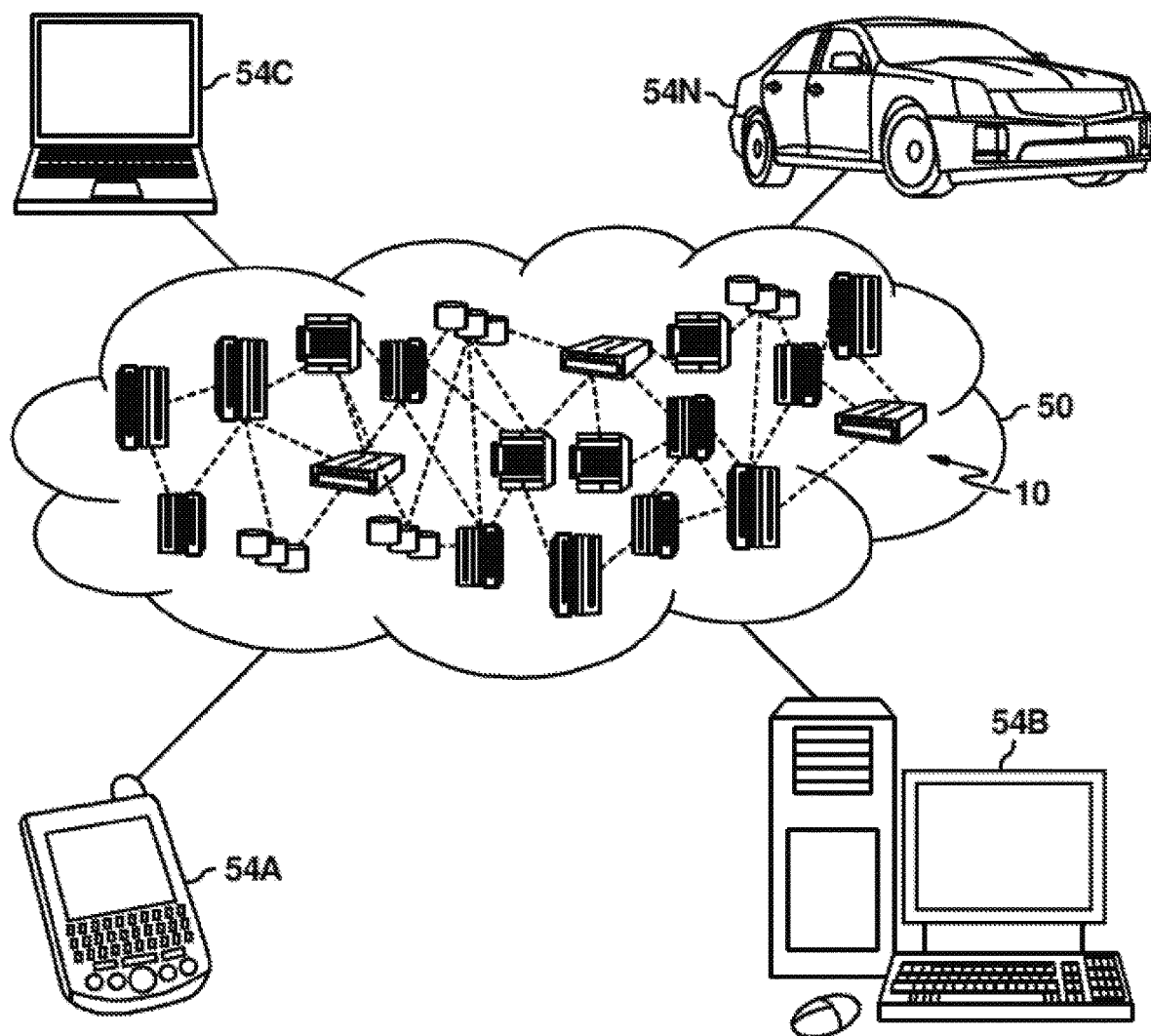
FIG. 5 depicts a cloud computing environment according to at least one embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 6:
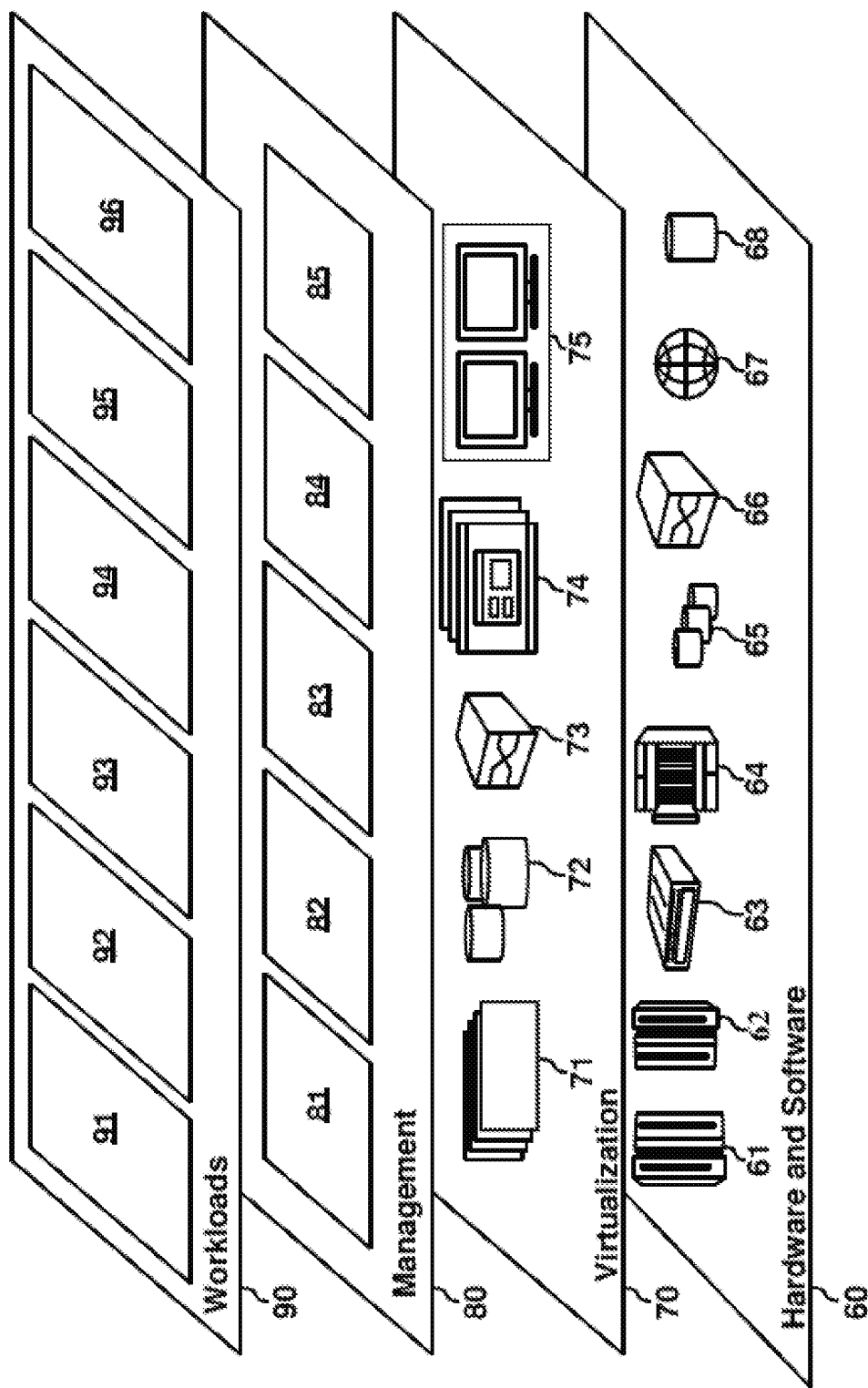
FIG. 6 depicts abstraction model layers according to at least on embodiment of the present invention.

Referring now to FIG. 6, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 7:
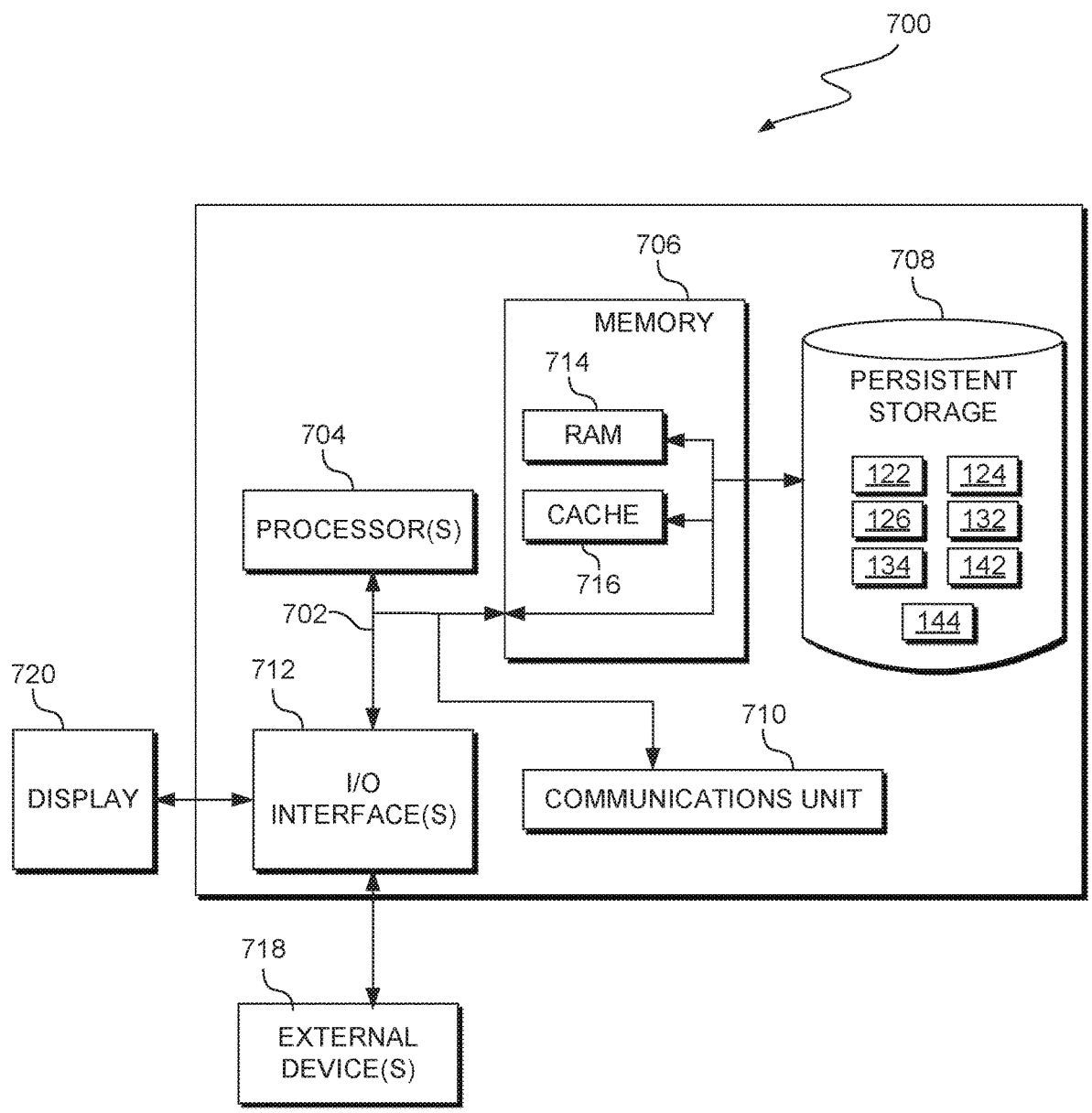
FIG. 7 depicts a block diagram of components of one or more computing devices within the computing environment depicted in FIG. 1, in accordance with an exemplary embodiment of the present invention.

FIG. 7 depicts a block diagram, 700, of components of computer system 120 and client device 130, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computer system 120 and client device 130 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media. Augmented dimension program 122, computer interface 124, augmented reality eyewear 126, sensors 128, client application 132 and client interface 135 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 110. In these examples, communications unit 710 includes one or more network interface cards. Communications unit 710 may provide communications through the use of either or both physical and wireless communications links. Augmented dimension program 122, computer interface 124, augmented reality eyewear 126, sensors 128, client application 132 and client interface 135 may be downloaded to persistent storage 708 through communications unit 710.

I/O interface(s) 712 allows for input and output of data with other devices that may be connected to computer system 120 and client device 130. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., augmented dimension program 122, computer interface 124, augmented reality eyewear 126, sensors 128, client application 132 and client interface 135, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
    tracking, by one or more processors, a field of view of a user wearing augmented reality eyewear, wherein within the field of view of the user the user utilizes one or more computing devices;
    identifying, by one or more processors, an orientation of the one or more computing devices;
    determining, by one or more processors, whether to present a holographic display to the user in two dimensions (2-D) or three dimensions (3-D) based, at least in part, on the orientation of the one or more computing devices;
    generating, by one or more processors, the holographic display and displaying the holographic display to the user via the augmented reality eyewear, wherein the holographic display extends beyond a boundary of the one or more computing devices; and
    updating, by one or more processors, the holographic display based, at least in part, on activity of the user.

2. The computer-implemented method of claim of 1, wherein:
    identifying the orientation of the one or more computing devices includes identifying that the one or more computing devices are lying flat on a surface, where a screen of the one or more computing devices is directed upwards towards the field of view of the user; and
    generating the holographic display includes generating the holographic display in 2-D, wherein the 2-D holographic display is presented to the user as an interface along a lateral boundary of a physical edge of the one or more computing devices.

3. The computer-implemented method of claim 1, wherein:
    identifying the orientation of the one or more computing devices includes identifying that the one or more computing devices are positioned in an upright configuration, wherein a screen of the one or more computing devices is directed towards the field of view of the user; and
    generating the holographic display includes generating the holographic display in 3-D, wherein the 3-D holographic display is presented to the user as an interactable object along a lateral boundary of a physical edge of the one or more computing devices.

4. The computer-implemented method of claim 1, wherein the one or more computing devices represent a multi-computing device environment, and wherein the method further comprises:
    determining, by one or more processors, that (i) two or more computing devices within the multi-computing device environment are executing a similar application, and (ii) screens of the two or more computing devices within the multi-computing device environment are within a threshold value of distance of one another; and
    wherein generating the holographic display includes generating a shared holographic display between lateral boundaries of physical edges of the screens of the two or more computing devices.

5. The computer-implemented method of claim 4, wherein the shared holographic display includes: (i) a 2-D holographic display, and (ii) a 3-D holographic display.

6. The computer-implemented method of claim 1, further comprising:
    tracking, by one or more processors, hand movements of the user;
    interpreting, by one or more processors, the hand movements of the user as interactions associated with the holographic display; and
    executing, by one or more processors, one or more functions associated with the interactions based, at least in part, on information displayed on the holographic display.

7. The computer-implemented method of claim 1, wherein the holographic display represents a personalized menu for the user and an extension of a viewing area of a screen of the one or more computing devices.

8. A computer program product, the computer program product comprising:
    one or more computer-readable storage media and program instructions stored on the one or more computer-readable storage media, the stored program instructions comprising:
        program instructions to track a field of view of a user wearing augmented reality eyewear, wherein within the field of view of the user the user utilizes one or more computing devices;
        program instructions to identify an orientation of the one or more computing devices;
        program instructions to determine whether to present a holographic display to the user in two dimensions (2-D) or three dimensions (3-D) based, at least in part, on the orientation of the one or more computing devices;
        program instructions to generate the holographic display and display the holographic display to the user via the augmented reality eyewear, wherein the holographic display extends beyond a boundary of the one or more computing devices; and
        program instructions to update the holographic display based, at least in part, on activity of the user.

9. The computer program product of claim 8, wherein:
    the program instructions to identify the orientation of the one or more computing devices include program instructions to identify that the one or more computing devices are lying flat on a surface, where a screen of the one or more computing devices is directed upwards towards the field of view of the user; and
    the program instructions to generate the holographic display include program instructions to generate the holographic display in 2-D, wherein the 2-D holographic display is presented to the user as an interface along a lateral boundary of a physical edge of the one or more computing devices.

10. The computer program product of claim 8, wherein:
    the program instructions to identify the orientation of the one or more computing devices include program instructions to identify that the one or more computing devices are positioned in an upright configuration, wherein a screen of the one or more computing devices is directed towards the field of view of the user; and
    the program instructions to generate the holographic display include program instructions to generate the holographic display in 3-D, wherein the 3-D holographic display is presented to the user as an interactable object along a lateral boundary of a physical edge of the one or more computing devices.

11. The computer program product of claim 8, wherein the one or more computing devices represent a multi-computing device environment, and wherein the stored program instructions further comprise:
program instructions to determine that (i) two or more computing devices within the multi-computing device environment are executing a similar application, and (ii) screens of the two or more computing devices within the multi-computing device environment are within a threshold value of distance of one another; and
wherein generating the holographic display includes generating a shared holographic display between lateral boundaries of physical edges of the screens of the two or more computing devices.

12. The computer program product of claim 11, wherein the shared holographic display includes: (i) a 2-D holographic display, and (ii) a 3-D holographic display.

13. The computer program product of claim 8, the stored program instructions further comprising:
program instructions to track hand movements of the user;
program instructions to interpret the hand movements of the user as interactions associated with the holographic display; and
program instructions to execute one or more functions associated with the interactions based, at least in part, on information displayed on the holographic display.

14. The computer program product of claim 8, wherein the holographic display represents a personalized menu for the user and an extension of a viewing area of a screen of the one or more computing devices.

15. A computer system, the computer system comprising:
one or more processors;
one or more computer readable storage medium; and
program instructions stored on the computer readable storage medium for execution by at least one of the one or more processors, the stored program instructions comprising:
program instructions to track a field of view of a user wearing augmented reality eyewear, wherein within the field of view of the user the user utilizes one or more computing devices;
program instructions to identify an orientation of the one or more computing devices;
program instructions to determine whether to present a holographic display to the user in two dimensions (2-D) or three dimensions (3-D) based, at least in part, on the orientation of the one or more computing devices;
program instructions to generate the holographic display and display the holographic display to the user via the augmented reality eyewear, wherein the holographic display extends beyond a boundary of the one or more computing devices; and
program instructions to update the holographic display based, at least in part, on activity of the user.

16. The computer system of claim 15, wherein:
the program instructions to identify the orientation of the one or more computing devices include program instructions to identify that the one or more computing devices are lying flat on a surface, where a screen of the one or more computing devices is directed upwards towards the field of view of the user; and
the program instructions to generate the holographic display include program instructions to generate the holographic display in 2-D, wherein the 2-D holographic display is presented to the user as an interface along a lateral boundary of a physical edge of the one or more computing devices.

17. The computer system of claim 15, wherein:
the program instructions to identify the orientation of the one or more computing devices include program instructions to identify that the one or more computing devices are positioned in an upright configuration, wherein a screen of the one or more computing devices is directed towards the field of view of the user; and
the program instructions to generate the holographic display include program instructions to generate the holographic display in 3-D, wherein the 3-D holographic display is presented to the user as an interactable object along a lateral boundary of a physical edge of the one or more computing devices.

18. The computer system of claim 15, wherein the one or more computing devices represent a multi-computing device environment, and wherein the stored program instructions further comprise:
program instructions to determine that (i) two or more computing devices within the multi-computing device environment are executing a similar application, and (ii) screens of the two or more computing devices within the multi-computing device environment are within a threshold value of distance of one another; and
wherein generating the holographic display includes generating a shared holographic display between lateral boundaries of physical edges of the screens of the two or more computing devices.

19. The computer system of claim 18, wherein the shared holographic display includes: (i) a 2-D holographic display, and (ii) a 3-D holographic display.

20. The computer system of claim 15, the stored program instructions further comprising:
program instructions to track hand movements of the user;
program instructions to interpret the hand movements of the user as interactions associated with the holographic display; and
program instructions to execute one or more functions associated with the interactions based, at least in part, on information displayed on the holographic display.

\* \* \* \* \*